United States Patent
Pettersson et al.

(10) Patent No.: US 8,474,512 B2
(45) Date of Patent: Jul. 2, 2013

(54) COOLER ARRANGEMENT FOR A MOTOR VEHICLE

(75) Inventors: Rickard Pettersson, Rönninge (SE); Frida Ödmark, Huddinge (SE)

(73) Assignee: Scania CV AB (Publ) (SE)

( * ) Notice: Subject to any disclaimer, the term of this patent is extended or adjusted under 35 U.S.C. 154(b) by 640 days.

(21) Appl. No.: 12/305,690

(22) PCT Filed: Jun. 25, 2007

(86) PCT No.: PCT/SE2007/050462
§ 371 (c)(1),
(2), (4) Date: Dec. 19, 2008

(87) PCT Pub. No.: WO2008/002263
PCT Pub. Date: Jan. 3, 2008

(65) Prior Publication Data
US 2010/0218497 A1   Sep. 2, 2010

(30) Foreign Application Priority Data
Jun. 30, 2006 (SE) ........................................ 0601445

(51) Int. Cl.
*B60H 1/06* (2006.01)

(52) U.S. Cl.
USPC .................................. 165/41; 165/44; 165/98

(58) Field of Classification Search
USPC .......... 165/41, 44, 51, 98; 60/599; 123/41.04, 123/41.48, 41.57, 41.58, 41.56, 41.59, 540, 123/542, 563
See application file for complete search history.

(56) References Cited

U.S. PATENT DOCUMENTS

| | | | | | |
|---|---|---|---|---|---|
| 774,556 | A | * | 11/1904 | Brock | 123/142.5 R |
| 1,393,917 | A | * | 10/1921 | Snell | 165/98 |
| 1,492,897 | A | * | 5/1924 | Ryder | 49/38 |
| 3,759,054 | A | | 9/1973 | Graber | |
| 3,854,459 | A | * | 12/1974 | Stimeling | 165/98 |
| 4,706,461 | A | * | 11/1987 | Pratt et al. | 60/599 |

(Continued)

FOREIGN PATENT DOCUMENTS

| DE | 7 716 940 U1 | 2/1979 |
|---|---|---|
| DE | 3522591 A1 | 1/1987 |

(Continued)

OTHER PUBLICATIONS

International Search Report dated Nov. 1, 2007, issued in corresponding international application No. PCT/SE2007/050463.

*Primary Examiner* — Teresa Walberg
(74) *Attorney, Agent, or Firm* — Ostrolenk Faber LLP

(57) ABSTRACT

A cooler device for a motor vehicle includes a radiator liquid cooler with a first cooler element for cooling radiator liquid for the motor vehicle's combustion engine, a charge air cooler with a second cooler element for cooling of charge air for the combustion engine, the first and the second cooler elements extending substantially parallel and side by side, with a narrow space between the cooler elements. A screening device in the space between the cooler elements regulates the air flow through the elements. A control mechanism switches the screening device to and fro between an open position in which the screening device does not, or at least does not appreciably, limit the air flow through the cooler elements, and a closed position in which the screening device limits the air flow through the cooler elements.

8 Claims, 3 Drawing Sheets

U.S. PATENT DOCUMENTS

| | | | |
|---|---|---|---|
| 4,753,288 A * | 6/1988 | Harvey | 165/98 |
| 5,566,748 A * | 10/1996 | Christensen | 165/67 |
| 6,142,213 A * | 11/2000 | Gallivan et al. | 165/41 |
| 6,848,524 B2 * | 2/2005 | Vaillancourt et al. | 180/68.1 |
| 2002/0104491 A1 * | 8/2002 | Izumi | 123/41.49 |
| 2004/0104007 A1 * | 6/2004 | Kolb | 165/41 |
| 2004/0188061 A1 * | 9/2004 | Beck et al. | 165/67 |
| 2005/0109483 A1 * | 5/2005 | Kolb | 165/41 |
| 2005/0279548 A1 * | 12/2005 | Kurtz et al. | 180/68.6 |
| 2006/0005943 A1 * | 1/2006 | Rasset et al. | 165/77 |
| 2010/0229842 A1 * | 9/2010 | Pettersson et al. | 123/568.12 |

FOREIGN PATENT DOCUMENTS

| | | |
|---|---|---|
| DE | 37 01 584 A1 | 8/1988 |
| GB | 733188 A | 4/1955 |
| SE | 524 096 C2 | 6/2004 |

* cited by examiner

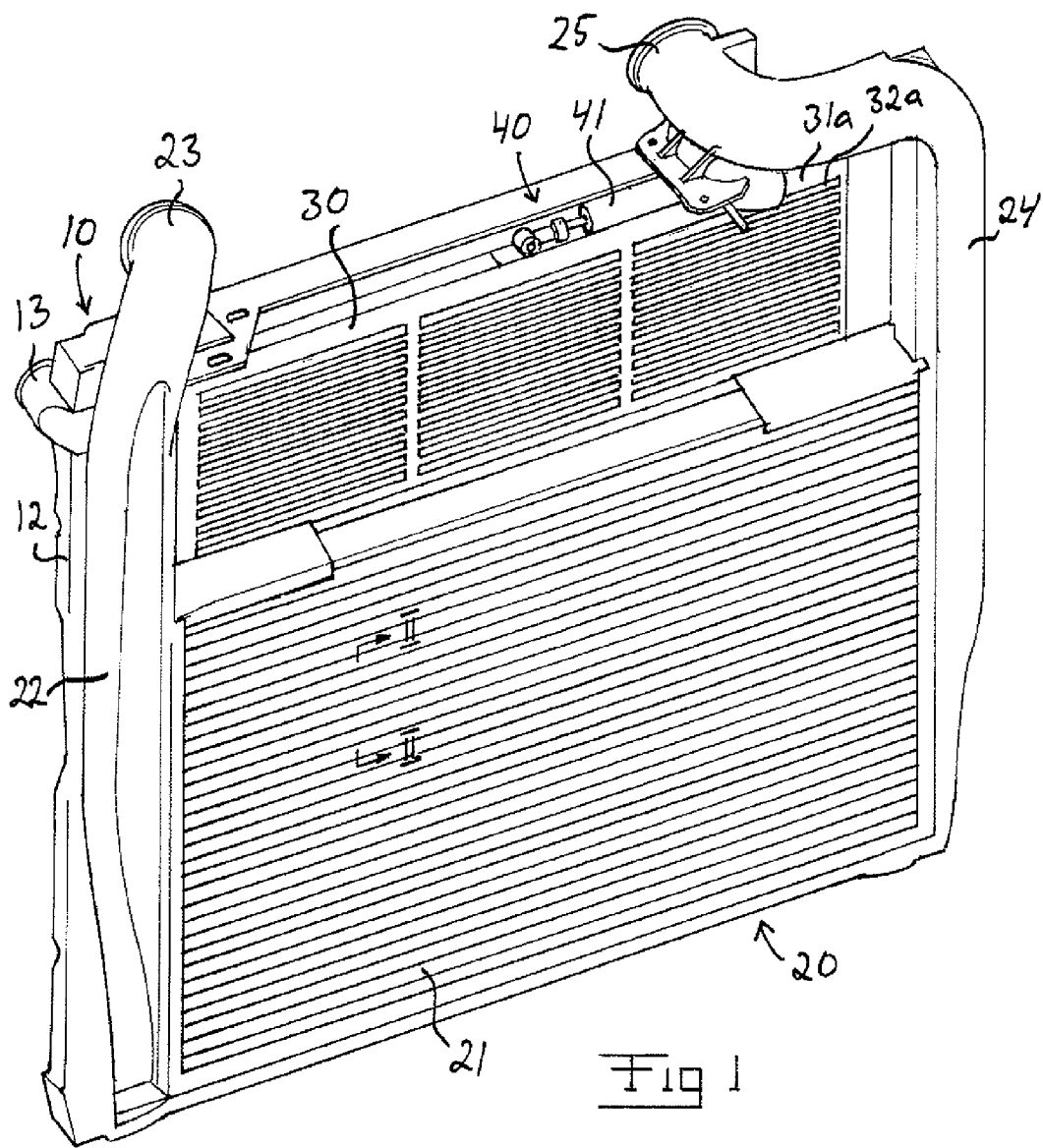
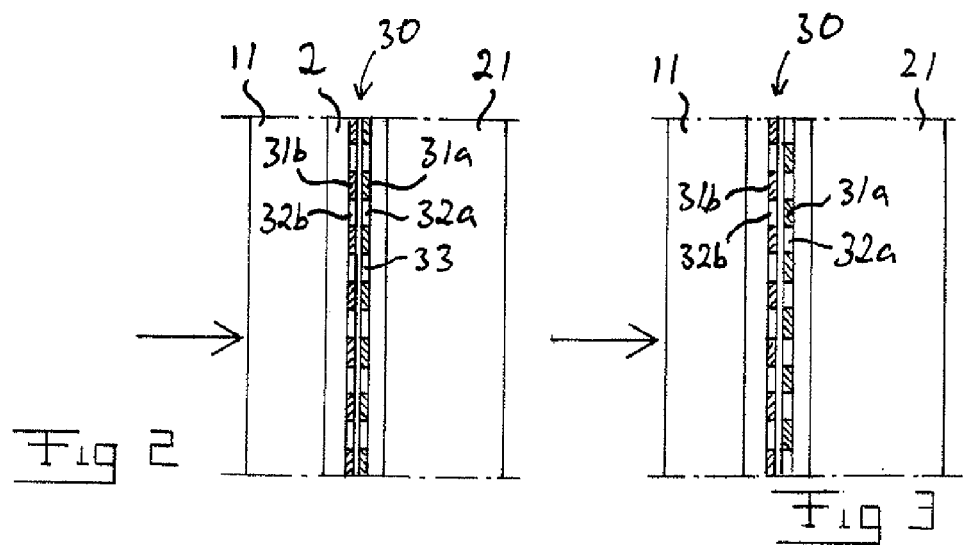

COOLER ARRANGEMENT FOR A MOTOR VEHICLE

CROSS REFERENCE TO RELATED APPLICATION

The present application is a 35 U.S.C. §§371 national phase conversion of PCT/SE2007/050462, filed 25 Jun. 2007, which claims priority of Sweden Application No. 0601445-0, filed 30 Jun. 2006, incorporated by reference herein. The PCT International Application was published in the English language.

FIELD OF THE INVENTION AND STATE OF THE ART

The present invention relates to a cooler device for a motor vehicle comprising a radiator liquid cooler with a first cooler element for cooling of radiator liquid for the motor vehicle's combustion engine and a charge air cooler with a second cooler element for cooling of charge air for said combustion engine, whereby the first cooler element and the second cooler element are assembled to one another with said cooler elements extending substantially parallel with one another, side by side, with a narrow space between them.

A motor vehicle with a supercharged combustion engine is often provided with a cooler device comprising a radiator liquid cooler with a substantially platelike cooler element for cooling of radiator liquid for the combustion engine and a charge air cooler with a substantially platelike cooler element for cooling of charge air for the combustion engine. The respective cooler elements comprise elongate pipelines and cooling flanges connected to the pipelines, whereby the medium which is to be cooled (i.e. radiator liquid or charge air respectively) is led through these pipelines and is cooled, via the cooling flanges, by ambient air which passes through air passages between the pipelines. The cooling flow of ambient air through the air passages is generated by movement of the vehicle and/or by a fan forming part of the cooler device.

A known way of saving space and achieving a cooler device of simple construction in the case of a cooler device of the type indicated above is to assemble the radiator liquid cooler and the charge air cooler to one another with the radiator liquid cooler's cooler element and the charge air cooler's cooler element extending substantially parallel with one another, side by side, with a narrow space between them, as for example described in SE 524 096 C2. Said space between the cooler elements is normally about 10-30 mm wide.

A known practice is to use various types of screening means, e.g. in the form of louvers, for regulating the air flow through one or more cooler elements of a cooler device in a motor vehicle. These screening means are often arranged immediately in front of or behind one or more cooler elements and are usually maneuverable, either manually or automatically, by a control mechanism to and fro between an open position in which the screening means limits only slightly or not at all the air flow through the relating cooler element or elements, and a closed position in which the screening means substantially completely or at least largely limits the air flow through said cooler element or elements. Various types of such screening means are described in, for example, U.S. Pat. No. 4,753,288A, DE 3 701 584 A1 and DE 7 716 940 U1.

OBJECT OF THE INVENTION

The object of the present invention is to provide a further development of a cooler device of the type indicated in the introduction in order to propose a cooler device with a configuration which in at least some respects affords an advantage relative to a conventionally configured cooler device of a relevant type.

SUMMARY OF THE INVENTION

According to the present invention, said object is achieved with a cooler device according to the invention.

According to the invention, the cooler device comprises:
- a radiator liquid cooler with a first cooler element for cooling of radiator liquid for the motor vehicle's combustion engine,
- a charge air cooler with a second cooler element for cooling of charge air for said combustion engine, whereby the radiator liquid cooler and the charge air cooler are assembled to one another with said cooler elements extending substantially parallel with one another, side by side, with a narrow space between the cooler elements,
- a screening means arranged in the space between said cooler elements in order to regulate the air flow through them, and
- a control mechanism by which the screening means is switchable to and fro between an open position in which the screening means does not, or at least does not appreciably, limit the air flow through the cooler elements, and a closed position in which the screening means limits the air flow through the cooler elements.

The expression "air flow" means here the flow of cooling ambient air which passes through air passages between the pipelines of the cooler elements.

The present invention is based on the insight that the narrow space situated between the cooler elements of a cooler device of the type indicated in the introduction can be used as a space for fitting a screening means intended to regulate the air flow through the cooler elements. The result is a particularly compact cooler device with adjustable cooling effect of its constituent cooler elements. This compact and space-saving configuration of the cooler device is advantageous in that the space available for a cooler device in a motor vehicle is often limited.

Various embodiments of the cooler device according to the invention are indicated in the description set out below.

BRIEF DESCRIPTION OF THE DRAWINGS

The invention is described below in more detail on the basis of embodiment examples with reference to the attached drawings, in which:

FIG. 1 depicts a schematic perspective view of part of a cooler device according to a first embodiment of the present invention, FIG. 2 depicts a schematic vertical cross-section along the line II-II in FIG. 1, showing in an open position a screening means forming part of the cooler device, FIG. 3 depicts the cross-section according to FIG. 2 with the cooler device's screening means in a closed position.

DETAILED DESCRIPTION OF PREFERRED EMBODIMENTS

Figure 4:
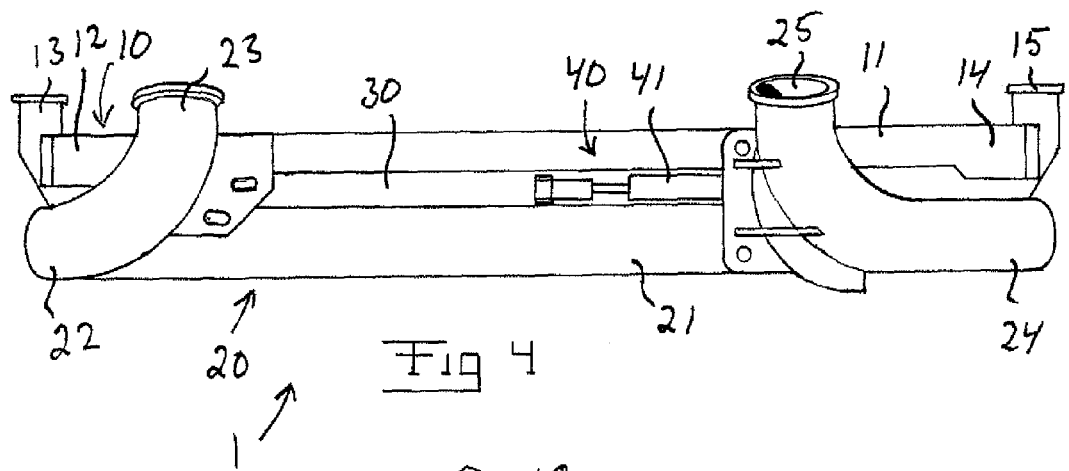
FIG. 4 depicts a schematic plan view from above of the cooler device according to FIG. 1.

FIGS. 1-6 illustrate a cooler device for a motor vehicle according to a first embodiment of the present invention. The cooler device 1 is intended for a motor vehicle which is provided with a supercharged combustion engine.

The cooler device 1 comprises a radiator liquid cooler 10 of conventional configuration with a substantially platelike cooler element 11 for cooling of radiator liquid for the motor vehicle's combustion engine. The radiator liquid cooler 10 further comprises a tubular inlet tank 12 with an inlet 13 intended to be connected, via an undepicted pipeline, to the motor vehicle's combustion engine in order to receive radiator liquid from the latter, and a tubular outlet tank 14 with an outlet 15 intended to be connected, via an undepicted pipeline, to the motor vehicle's combustion engine in order to lead radiator liquid back to the latter. The cooler element 11 is arranged between said inlet tank 12 and outlet tank 14 and comprises elongate pipelines 16 extending at a distance from one another (one of these pipelines is depicted in FIG. 6) and cooling flanges connected to these pipelines. The cooler element's pipelines 16 are connected to and extend between the tanks 12, 14 in order to lead radiator liquid from the inlet tank 12 to the outlet tank 14. The cooler element 11 is of conventional configuration and its pipelines and cooling flanges are not depicted in FIGS. 1-5. Radiator liquid from the motor vehicle's combustion engine is led through the cooler element's pipelines 16 from the inlet tank 12 to the outlet tank 14 and is cooled, via the cooling flanges, by ambient air which passes through air passages (not depicted) between the pipelines. The tanks 12, 14 extend substantially parallel with one another at opposite edges of the cooler element 11 and form end portions of the radiator liquid cooler 10. In the embodiment illustrated, the respective tanks 12, 14 extend substantially vertically.

The cooler device 1 also comprises a charge air cooler 20 of conventional configuration with a substantially platelike cooler element 21 for cooling of charge air for the motor vehicle's combustion engine, i.e. inlet air which is intended for the combustion engine and is compressed in a compressor in the motor vehicle before it is supplied to the combustion engine. The charge air cooler 20 further comprises a tubular inlet tank 22 with an inlet 23 intended to receive, via an undepicted pipeline, warm charge air from a compressor of the motor vehicle, and a tubular outlet tank 24 with an outlet 25 intended to be connected, via an undepicted pipeline, to the motor vehicle's combustion engine in order to feed charge air to the latter. The cooler element 21 is arranged between the inlet tank 22 and the outlet tank 24 and comprises elongate pipelines 26 extending at a distance from one another (one of these pipelines is depicted in FIG. 6) and cooling flanges connected to these pipelines. The cooler element's pipelines 26 are connected to and extend between the tanks 22, 24 in order to lead charge air from the inlet tank 22 to the outlet tank 24. Charge air from said compressor is led through the cooler element's pipelines 26 from the inlet tank 22 to the outlet tank 24 and is cooled, via the cooling flanges, by ambient air which flows through air passages (not depicted) between the pipelines. The tanks 22, 24 extend substantially parallel with one another at opposite edges of the cooler element 21 and form end portions of the charge air cooler 20. In the embodiment depicted, the respective tanks 22, 24 extend substantially vertically.

The charge air cooler 20 is arranged in front of the radiator liquid cooler 10 as seen in the motor vehicle's intended direction of movement. The cooling flow of ambient air through the air passages of the respective cooler elements 11, 21 is generated by forward movement of the motor vehicle and/or by a fan (not depicted). This fan is normally arranged behind the radiator liquid cooler 10 as seen in the motor vehicle's intended direction of movement.

In the cooler device 1 according to the invention, the radiator liquid cooler 10 and the charge air cooler 20 are assembled to one another with their cooler elements 11, 21 extending substantially parallel with one another, side by side, with a narrow space 2 between them. This entails the inlet tank 12 of the radiator liquid cooler 10 being arranged close to and substantially parallel with the inlet tank 22 of the charge air cooler 20, while the outlet tank 14 of the radiator liquid cooler 10 is arranged close to and substantially parallel with the outlet tank 24 of the charge air cooler 20, as illustrated in FIGS. 4 and 6. The coolers 10, 20 are with advantage held together by fastening means, e.g. in the form of screws or bolts, accommodated in mutually opposite brackets 18, 28 of the mutually facing inlet tanks 12, 22 and outlet tanks 14, 24 respectively. Said space 2 between the cooler elements 11, 21 occurs because the respective tanks 12, 14, 22, 24 each protrude somewhat in front of the outer sideplane 19, 29 of the relating cooler element 11, 21. This space 2 is normally 10-30 mm wide.

The cooler device 1 further comprises:
- a screening means 30 arranged in the space 2 between said cooler elements 11, 21 in order to regulate the air flow through them, and
- a control mechanism 40 by which the screening means 30 is switchable to and fro between an open position in which the screening means 30 does not, or at least does not appreciably, limit the air flow through the cooler elements 11, 21, and a closed position in which the screening means 30 substantially completely, or at least to a larger extent than in the open position, limits the air flow through said space 2 and hence the air flow through the cooler elements 11, 21.

Figure 5:
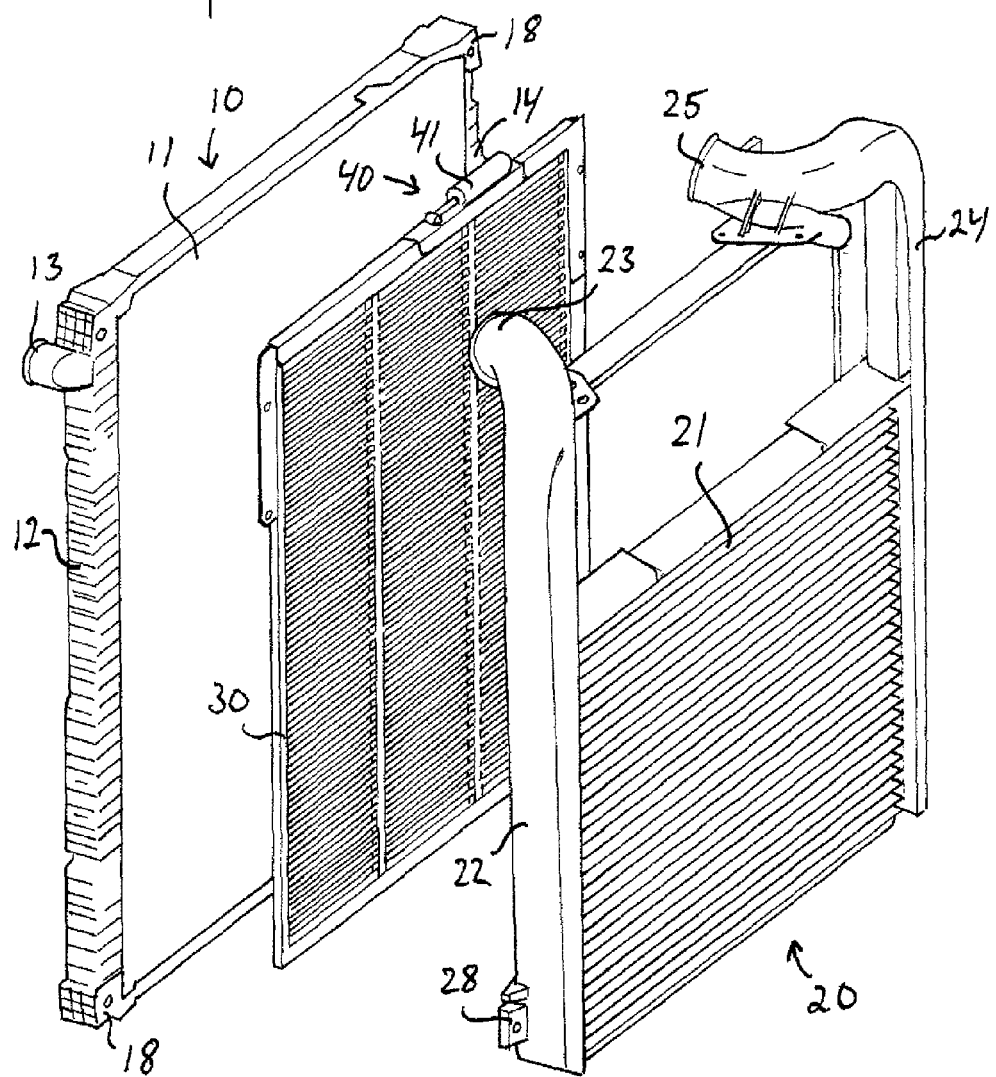
FIG. 5 depicts a schematic exploded view of the cooler device according to FIG. 1.
Figure 6:
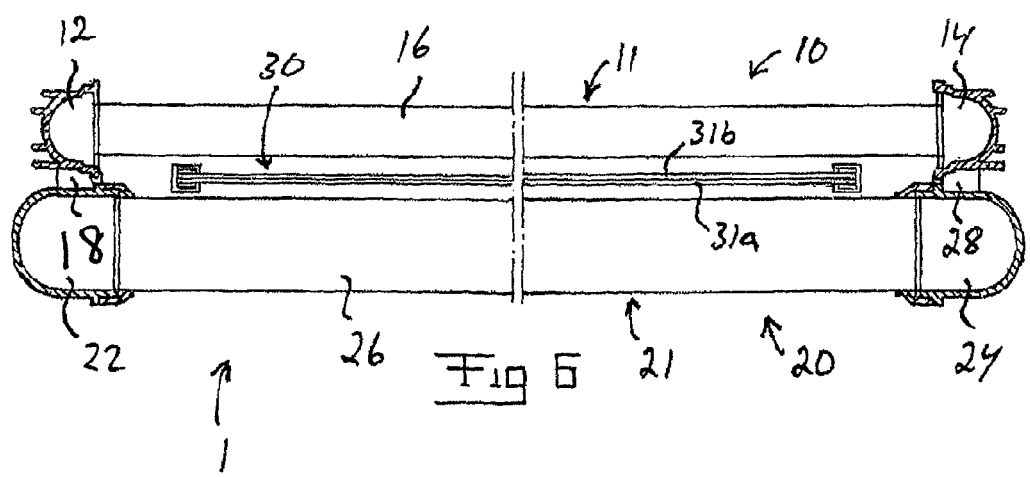
FIG. 6 depicts a schematic horizontal cross-section through the cooler device according to FIG. 1.

The control mechanism 40 may with advantage comprise a pneumatic or hydraulic cylinder 41 for switching the screening means 30, as illustrated in FIGS. 1, 4 and 5.

In the embodiment illustrated in FIGS. 1-6, the screening means 30 comprises two disc-like screening elements 31a, 31b which face one another and have apertures 32a, 32b through them. One screening element 31a is movable in its plane of extent relative to the other screening element 31b by the control mechanism 40 in such a way that the apertures 32a, 32b in the screening elements cooperate to form air passages 33 which extend through the screening means 30 and which are larger when the screening means is in the open position (see FIG. 2) than when the screening means is in the closed position (see FIG. 3). Said apertures 32a, 32b may for example take the form of elongate gaps, as illustrated in FIGS. 1 and 5.

Figure 7:
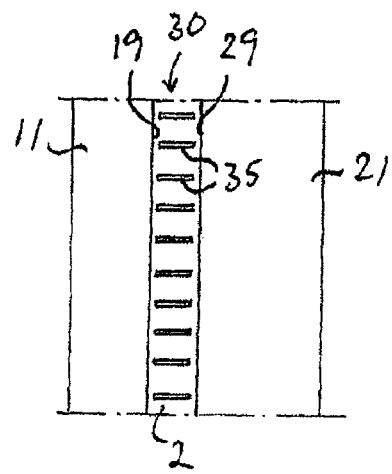
FIG. 7 depicts a schematic vertical cross-section of part of a cooler device according to a second embodiment of the invention, with the cooler device's screening means in an open position
Figure 8:
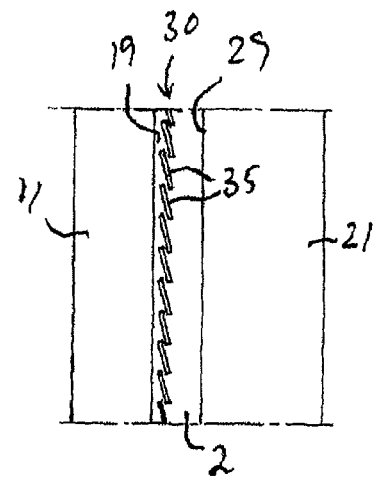
FIG. 8 depicts the cross-section according to FIG. 7, with the cooler device's screening means in a closed position.

In the embodiment illustrated in FIGS. 7 and 8, the screening means 30 takes the form of a louver comprising blades 35 which are pivotable by an undepicted control mechanism to and fro between an open position (see FIG. 7) where the blades 35 extend substantially perpendicular to the adjacent sideplanes 19, 29 of the cooler elements 11, 21, and a closed position (see FIG. 8) where the blades 35 extend substantially parallel with the adjacent sideplanes 19, 29 of the cooler elements 11, 21. The blades 35 are with advantage arranged to overlap one another in the closed position, as illustrated in FIG. 8.

The screening means 30 might also be of some other configuration than that illustrated in the attached drawings and might for example comprise a screening fabric which is movable by a control mechanism into and out of the space 2 between the cooler elements 11, 21.

The screening means 30 may for example be clamped firmly between the radiator liquid cooler 10 and the charge air cooler 20 or be fastened to either of them.

The invention is of course in no way limited to the embodiments described above, since many possibilities for modifications thereof are likely to be obvious to a specialist in the field without thereby departing from the fundamental concept of the invention as defined in the attached claims.

The invention claimed is:

1. A cooler device for a motor vehicle comprising
   a radiator liquid cooler with a first cooler element operable for cooling of radiator liquid for a combustion engine of the motor vehicle;
   a charge air cooler with a second cooler element operable for cooling of charge air for the combustion engine; the radiator liquid cooler and the charge air cooler being assembled to one another and the cooler elements extending substantially parallel with one another, side by side, and with a narrow space between the cooler elements,
   a screening device arranged in the narrow space between the cooler elements and operable to regulate an air flow past the screening device and through the cooler elements, the screening device comprising pivotable louvers, and
   a control mechanism to switch the screening device to and fro between an open position in which the screening device does not, or at least does not appreciably, limit the air flow through the cooler elements, and a closed position in which the screening device limits the air flow between the cooler elements,
   wherein the screening device is clamped firmly between the radiator liquid cooler and the charge air cooler or is fastened to either of them.

2. A cooler device according to claim 1, wherein the pivotable louvers comprise blades which are pivotable between the open position and the closed position and the control mechanism is operable for pivoting the blades to selectively limit or not limit the air flow.

3. A cooler device according to claim 1, wherein the narrow space between the cooler elements is 10-30 mm wide.

4. A cooler device according to claim 1, wherein
   the radiator liquid cooler comprises a first tubular inlet tank having an inlet for radiator liquid, and a first tubular outlet tank having an outlet for radiator liquid, the first tanks being connected to the first cooler element and being arranged at respective opposite edges of the first cooler element,
   the charge air cooler comprises a second tubular inlet tank having an inlet for charge air, and a second tubular outlet tank having an outlet for charge air, the charge air cooler second tanks being connected to the second cooler element and being arranged at respective opposite edges of the second cooler element, and
   the radiator liquid cooler and the charge air cooler are assembled to one another with the radiator liquid cooler's first inlet tank arranged close to and substantially parallel with the charge air cooler's second inlet tank, and with the radiator liquid cooler's first outlet tank arranged close to and substantially parallel with the charge air cooler's second outlet tank.

5. A cooler device for a motor vehicle comprising
   a radiator liquid cooler with a first cooler element operable for cooling of radiator liquid for a combustion engine of the motor vehicle;
   a charge air cooler with a second cooler element operable for cooling of charge air for the combustion engine; the radiator liquid cooler and the charge air cooler being assembled to one another, side by side, and with a narrow space between the cooler elements,
   a screening device arranged in the narrow space between the cooler elements and operable to regulate an air flow past the screening device and through the cooler elements downstream in the direction of air flow through the cooler device; and
   a control mechanism to switch the screening device to and fro between an open position in which the screening device does not, or at least does not appreciably, limit the air flow through the cooler elements, and a closed position in which the screening device limits the air flow between the cooler elements,
   wherein the screening device comprises two screening elements having planar disc-shaped faces which face one another and the screening elements have apertures through them, at least one of the screening elements being movable in a respective plane of extent relative to the other screening element under operation by the control mechanism, the apertures in the screening elements being arranged to cooperate in order to form air passages which extend through the screening device and such that the passages are larger when the screening device is in the open position than when the screening device is in the closed position, the planar disc-shaped faces covering an entire surface area of each of the two screening elements, the surface area being an area of a surface of each of the two screening elements transverse to the direction of air flow through the cooler device.

6. A cooler device according to claim 5, wherein the cooler elements extend substantially parallel with one another.

7. A cooler device according to claim 5, wherein the radiator liquid cooler is upstream and the charge air cooler is downstream in the direction of air flow.

8. A cooler device according to claim 5, wherein the charge air cooler comprises a single inlet tank, the single inlet tank being located on a single side of the radiator liquid cooler.

* * * * *

UNITED STATES PATENT AND TRADEMARK OFFICE
CERTIFICATE OF CORRECTION

PATENT NO. : 8,474,512 B2 Page 1 of 1
APPLICATION NO. : 12/305690
DATED : July 2, 2013
INVENTOR(S) : Pettersson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this
Eighth Day of September, 2015

Michelle K. Lee
*Director of the United States Patent and Trademark Office*